US009109549B2

(12) United States Patent
Laitala et al.

(10) Patent No.: US 9,109,549 B2
(45) Date of Patent: Aug. 18, 2015

(54) SYSTEMS AND METHODS FOR CONTROLLING FUEL VAPOR FLOW IN AN ENGINE-DRIVEN GENERATOR

(75) Inventors: John P. Laitala, Appleton, WI (US); Eric M. Kropp, Oshkosh, WI (US); Nathan J. Jochman, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 581 days.

(21) Appl. No.: 13/423,980

(22) Filed: Mar. 19, 2012

(65) Prior Publication Data

US 2012/0240900 A1    Sep. 27, 2012

Related U.S. Application Data

(60) Provisional application No. 61/466,317, filed on Mar. 22, 2011.

(51) Int. Cl.
| | | |
|---|---|---|
| *F02M 33/02* | (2006.01) | |
| *F02M 33/04* | (2006.01) | |
| *F02M 21/04* | (2006.01) | |
| *F02M 25/08* | (2006.01) | |
| *B60K 15/035* | (2006.01) | |

(52) U.S. Cl.
CPC ...... *F02M 25/0836* (2013.01); *B60K 15/03504* (2013.01); *B60K 15/03519* (2013.01); *B60K 2015/03566* (2013.01)

(58) Field of Classification Search
CPC ............ F02M 21/023; F02M 25/0836; F02M 25/0854; B60K 15/03504
USPC ......... 123/2, 3, 445, 454, 459, 461, 480–482, 123/505, 506, 518–520, 525, 198 D, 198 DB
See application file for complete search history.

(56) References Cited

U.S. PATENT DOCUMENTS

| | | | |
|---|---|---|---|
| 4,877,146 A | 10/1989 | Harris | |
| 6,418,915 B1 * | 7/2002 | Harrigan, Sr. | ................ 123/520 |
| 6,681,789 B1 | 1/2004 | Moulis et al. | |
| 7,114,492 B2 * | 10/2006 | Reddy | ............................ 123/518 |
| 7,216,635 B1 * | 5/2007 | Roche et al. | ................... 123/516 |
| 7,426,919 B2 * | 9/2008 | Kano et al. | ...................... 123/520 |

(Continued)

FOREIGN PATENT DOCUMENTS

EP    1895145 A2    5/2008

OTHER PUBLICATIONS

International Search Report & Written Opinion of PCT/US2012/029971 dated Jun. 20, 2012.

*Primary Examiner* — John Kwon
*Assistant Examiner* — Johnny H Hoang
(74) *Attorney, Agent, or Firm* — Fletcher Yoder P.C.

(57) ABSTRACT

An engine-driven generator that controls fuel vapor flow is provided. The engine-driven generator includes an engine having an air intake, wherein the engine is configured to drive a generator. The engine-driven generator also includes a fuel tank coupled to the engine and configured to provide fuel to the engine. The engine-driven generator includes a valve coupled between the air intake of the engine and the fuel tank. The engine-driven generator also includes a control device configured to transition the valve between a first position and a second position. The first position allows fuel vapor to flow between the fuel tank and the air intake of the engine and the second position inhibits the fuel vapor from flowing between the fuel tank and the air intake of the engine.

13 Claims, 4 Drawing Sheets

(56) References Cited

U.S. PATENT DOCUMENTS

| | | | |
|---|---|---|---|
| 7,536,251 B2* | 5/2009 | Saito et al. | 701/104 |
| 8,240,292 B1* | 8/2012 | Roche et al. | 123/516 |
| 8,443,787 B2* | 5/2013 | Schondorf et al. | 123/520 |
| 8,770,175 B2* | 7/2014 | Kitamura et al. | 123/520 |
| 2003/0183180 A1* | 10/2003 | Wada | 123/2 |
| 2004/0168654 A1* | 9/2004 | Radtke | 123/2 |
| 2007/0186910 A1* | 8/2007 | Leone et al. | 123/520 |
| 2008/0000456 A1* | 1/2008 | Modien | 123/520 |
| 2008/0202447 A1* | 8/2008 | Kochi et al. | 123/2 |
| 2008/0202480 A1 | 8/2008 | Yamamoto et al. | |
| 2008/0236551 A1* | 10/2008 | Althof et al. | 123/520 |
| 2008/0251053 A1* | 10/2008 | Shears et al. | 123/518 |
| 2008/0251055 A1* | 10/2008 | Schmalz et al. | 123/519 |
| 2010/0031932 A1* | 2/2010 | Mai et al. | 123/520 |
| 2010/0071672 A1* | 3/2010 | Grunwald et al. | 123/520 |
| 2011/0067676 A1* | 3/2011 | Mai et al. | 123/518 |

* cited by examiner

SYSTEMS AND METHODS FOR CONTROLLING FUEL VAPOR FLOW IN AN ENGINE-DRIVEN GENERATOR

CROSS REFERENCE TO RELATED APPLICATIONS

This application is a Non-Provisional patent application of U.S. Provisional Patent Application No. 61/466,317 entitled "Running Loss Emission Control for Engine Driven Welder", filed Mar. 22, 2011, which is herein incorporated by reference in its entirety.

BACKGROUND

The invention relates generally to engine-driven generators, and, more particularly, to systems and methods for controlling fuel vapor flow in an engine-driven generator.

Welding is a process that has become increasingly ubiquitous in various industries and applications. While such processes may be automated in certain contexts, a large number of applications continue to exist for manual welding operations, which often rely on the use of an engine-driven generator to power the welding process. Engine-driven generators typically include internal components, such as electrical circuitry, a generator, and an engine, which cooperate to produce a suitable power output for the welding operation. Such power outputs may be alternating current (AC) power or direct current (DC) power, depending on the welding operation being performed. Moreover, the power may be adapted for particular applications, such as metal inert gas (MIG) welding, tungsten inert gas (TIG) welding, stick welding, and so forth.

A liquid fuel is often used as a combustible material to operate the engine of an engine-driven generator. As will be appreciated, fuel vapor may be generated in the fuel tank under normal operating conditions. Certain configurations of engine-driven generators direct the fuel vapors to a combustion air intake of the engine. However, when fuel vapors are present at the combustion air intake of the engine during shutdown of the engine-driven generator, the engine-driven generator may "diesel" or "run on." When this occurs, the engine-driven generator may operate undesirably for a period of time (e.g., multiple seconds or minutes). Accordingly, there is a need in the field for systems and method to overcome such undesirable operation.

BRIEF DESCRIPTION

In one embodiment, an engine-driven generator includes an engine having an air intake, wherein the engine is configured to drive a generator. The engine-driven generator also includes a fuel tank coupled to the engine and configured to provide fuel to the engine. The engine-driven generator includes a valve coupled between the air intake of the engine and the fuel tank. The engine-driven generator also includes a control device configured to transition the valve between a first position and a second position. The first position allows fuel vapor to flow between the fuel tank and the air intake of the engine and the second position inhibits the fuel vapor from flowing between the fuel tank and the air intake of the engine.

In another embodiment, a method for controlling fuel vapor flow in an engine-driven generator includes transitioning a valve to a first position when an engine of the engine-driven generator begins operating. The first position allows the fuel vapor to flow between a fuel tank of the engine-driven generator and an air intake of the engine. The method also includes transitioning the valve to a second position when the engine of the engine-driven generator stops operating. The second position inhibits the fuel vapor from flowing between the fuel tank of the engine-driven generator and the air intake of the engine.

In another embodiment, a portable engine-driven system includes an engine having an air intake. The system also includes a fuel tank coupled to the engine and configured to provide fuel to the engine. The system includes a solenoid valve coupled between the air intake of the engine and the fuel tank and configured to transition between a first position and a second position. The first position allows fuel vapor to flow between the fuel tank and the air intake of the engine and the second position inhibits the fuel vapor from flowing between the fuel tank and the air intake of the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
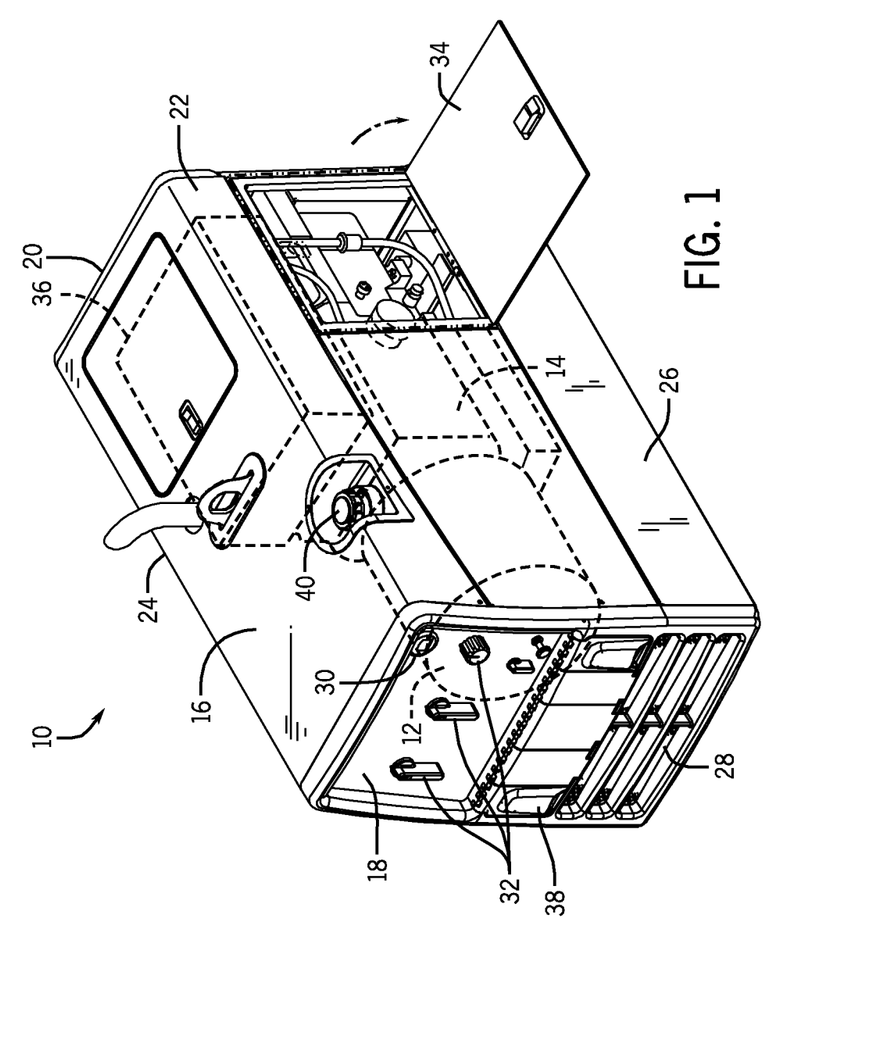
FIG. 1 is a perspective view of an embodiment of a portable engine-driven welding generator system which may employ devices for controlling fuel vapor flow in accordance with aspects of the present disclosure.

Referring now to the drawings, FIG. 1 illustrates a portable engine-driven welding generator system 10 having a generator 12 drivingly coupled to an engine 14 in a single enclosure 16 in accordance with an exemplary embodiment of the present technique. As discussed in detail below, the system 10 may employ devices for controlling fuel vapor flow. For example, the system 10 may employ devices that allow fuel vapor to flow to the engine 14 while the engine 14 is operating and inhibit fuel vapor from flowing to the engine 14 while the engine 14 is not operating. Therefore, "dieseling" may be reduced and/or eliminated by blocking fuel vapors from flowing to the engine 14 at undesired times. As will be appreciated, the disclosed embodiments may be used in a variety of electromechanical systems, including welding systems, non-welding systems, motor-generator systems, and so forth.

As discussed in detail below, the single enclosure 16 includes multiple functionalities in one portable system to improve productivity and reduce space consumption. Specifically, the system 10 is configured to output electrical power for a variety of applications, including welding, cutting, battery charging, jump starting, and so forth. Moreover, the system 10 includes intelligence (e.g., logic in software and/or hardware) to adjust the outputs based on various feedback of the system 10 and an external device receiving the electrical power from the system 10. For example, the system 10 does not randomly provide output power for welding and/or charging, but rather the system 10 analyzes various parameters, executes various logic, and intakes sensed feedback to make an intelligent decision regarding the output. In some embodiments, however, the system 10 may provide output power without adjustment or analysis of any parameters or feedback. The enclosure 16 consists of a front panel 18, a rear panel 20, a right side 22, and a left side 24, all engaging a base 26 to complete the enclosure 16. The enclosure 16 protects the engine 14 and the generator 12 from dust, debris, and rough handling. The enclosure 16 also reduces noise and helps to cool the engine 14 by preventing hot air recirculation via a cool air inlet 28 on the front panel 18 by pulling air through the interior volume of the enclosure 16. In certain embodiments, the rear panel 20 may also include an air inlet for air intake and/or exhaust flow.

A control system regulates the electrical power supplied by the generator 12 and allows for it to be used for a welding process and/or auxiliary power to other devices or tools. The front panel 18 may include various control inputs, indicators, displays, electrical outputs, and so forth. In one embodiment, the front panel 18 may include various indicators 30 to provide feedback to the user. For example, the indicator 30 may include an LCD to display voltage, amperage, air pressure, and the like. Further, in some embodiments, a user input 32 may include a touch screen, knobs, and/or buttons configured for a mode of operation, an output level or type, etc. For instance, the user input 32 may include a dial rotatable to select a mode of operation, such as a DC weld, an AC weld, a battery charge, or a tool operation. Embodiments of the front panel 18 include any number of inputs and outputs, such as welding methods, oil pressure, oil temperature, and system power.

The engine 14 provides output power (e.g., a mechanical output) to drive the welding generator 12. In certain embodiments, the power from the engine 14 operates the generator 12 via a drive shaft. The drive shaft may be directly or indirectly coupled to one or more driven mechanisms. For example, an indirect coupling may include a belt and pulley system, a gear system, or a chain and sprocket system. In the present embodiment, the drive shaft couples directly to the generator 12. However, either arrangement can be used for the connection between the engine 14 and the generator 12.

In an embodiment, the engine 14 may include a combustion engine powered by gas or diesel, LP fuel, natural gas, or other fuel, and driving one or more drive shafts. For example, the engine 14 may include an industrial gas/diesel engine configured to output anywhere from about 9 horsepower (Hp) to about 30 Hp. Generally, the weight of such an engine 14 may vary with the size and Hp rating of the engine 14. For example, a 23 Hp engine may weigh approximately 100 lbs., whereas a similar 9 Hp engine may weigh less than approximately 50 lbs. Thus, the portable system 10 may benefit from the use of a smaller engine 14.

As discussed previously, embodiments may include a generator 12 coupled to the engine 14. Thus, the generator 12 may convert the power output (e.g., mechanical energy) of the engine 14 to an electrical power. Generally, the generator 12 includes a device configured to convert a rotating magnetic field into an electrical current (e.g., AC generator). The generator 12 includes a rotor (the rotating portion of the generator) and a stator (the stationary portion of the generator). For example, the rotor of the generator 12 may include the rotating drive shaft of the engine 14 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 12 may include a plurality of independent winding sections in the rotors and/or stators, such that the generator 12 is configured to output multiple electrical outputs having different characteristics. For example, the generator 12 may include a first section configured to drive a welding current to a welder and a second section configured to drive a current for other AC outputs. In some embodiments, multiple generators 12 may be connected to the drive shaft.

As depicted in FIG. 1, the enclosure 16 includes various access panels to enable servicing, repair, and so forth. For example, a side access panel 34 is configured to attach to opposite sides of the enclosure 16. The top of the enclosure 16 includes an access panel or hatch 36, which are both rotatable between open and closed positions above the components of the system 10. The top hatch 36 can rotate open to enable access to the engine 14. Similarly, the side access panel 34 can rotate open to enable access to the engine 14, oil filter, spark plugs, etc.

The illustrated system 10 also includes various external connections 38. The external connections 38 may include various outlets and couplers configured to provide access to the electrical power generated by the system 10. For example, the external connections 38 may include an AC power output and a DC power output, which may be coupled to various devices and tools. For example, the AC power output may provide auxiliary power to various devices or tools integrated within or coupled to the system 10. The DC power output can be coupled to various welding and cutting tools, such as a welding torch. The welding devices may receive current from the generator 12 via the external connections 38. As will be appreciated, the torch may include various welding devices, such as a TIG (tungsten inert gas) torch, a MIG (metal inert gas) gun, or a plasma cutting torch. The system 10 may also include welding cable connecting the torch to the external connections 38. Further, the system 10 may include other components necessary for operation of a welding device, such as a wire feeder, a shielding gas supply, and/or any other component, or combination thereof. The system 10 also includes a fuel tank that holds fuel to be provided to the engine 14. The fuel tank includes an opening for adding fuel to the fuel tank. A fuel cap 40 is used to cover the opening of the fuel tank and may be used to vent fuel vapor. For example, the fuel cap 40 may include a pressure relief valve for releasing fuel vapor when pressure within the fuel tank exceeds a threshold pressure.

Figure 2:
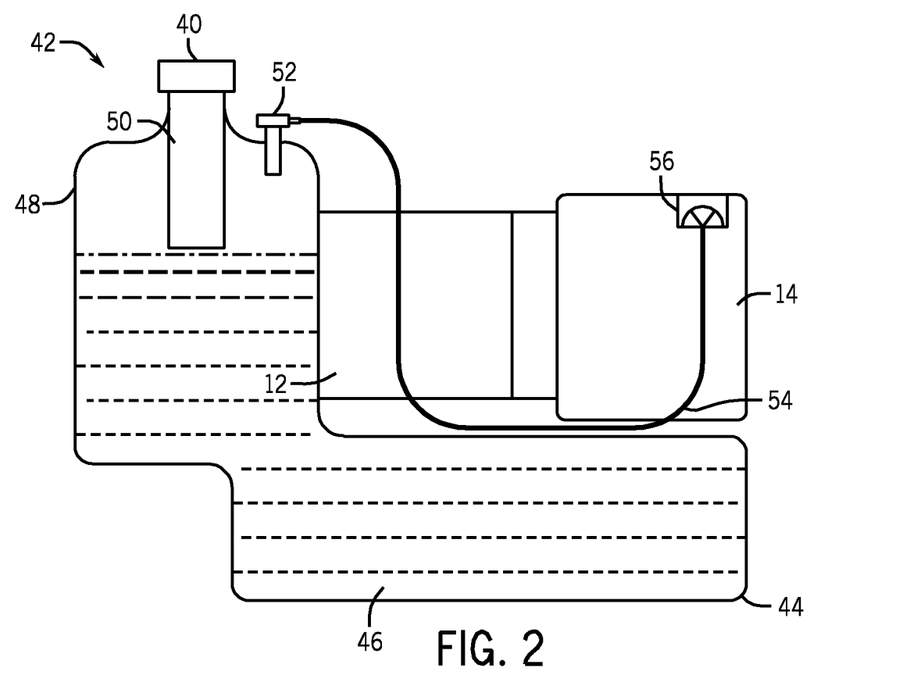
FIG. 2 is a pictorial view of an embodiment of a system for controlling fuel vapor flow in an engine-driven generator in accordance with aspects of the present disclosure.

FIG. 2 is a pictorial view of an embodiment of a system 42 for controlling fuel vapor flow in the engine-driven generator 10 (or in any engine-driven system, such as portable engine-driven systems). The system 42 includes a fuel tank 44 for holding fuel 46 (e.g., generally liquid fuel) that is provided to the engine 14 and is used to power the engine 14. As will be appreciated, fuel vapor of the fuel 46 may collect in and contact an upper portion 48 (e.g., vapor space) of the fuel tank 44. The upper portion 48 may act as an accumulator for fuel vapor. In certain embodiments, the volume of the upper portion 48 may be approximately 5 to 20% of the total fuel tank 44 volume. The fuel cap 40 covers an opening used for filling the fuel tank 44 with the fuel 46. To inhibit fuel vapor from freely flowing into the atmosphere, the fuel cap 40 may generally seal the opening (e.g., the fuel cap 40 may not include apertures that allow fuel vapor to freely flow out of the fuel tank 44). A neck tube 50 extends from the fuel cap 40 and may be used to help determine the recommended amount of liquid fuel 46 in the fuel tank 44 to allow for thermal expansion of the fuel 46.

A valve 52 may be used to direct fuel vapor from the fuel tank 44 (e.g., the upper portion 48 of the fuel tank 44) to the engine 14. As illustrated, the valve 52 may be coupled to the upper portion 48 of the fuel tank 44. Further, a hose 54 couples the valve 52 to an air intake 56 of the engine 14. The engine 14 may combust fuel vapor from the fuel tank 44 and inhibit the fuel vapor from being vented (e.g., escaping from the system 42) to the atmosphere, such as while the engine 14 is operating. For example, the valve 52 may be closed (e.g., to inhibit fuel vapor from flowing to the engine 14) while the engine 14 is not operating and the valve 52 may be opened (e.g., to enable fuel vapor to flow to the engine 14) while the engine 14 is operating. The valve 52 may be any suitable valve and may be controlled by any suitable controlling mechanism of the engine-driven generator 10. In certain embodiments, the fuel cap 40 may include a pressure relief portion to relieve vapor pressure buildup in the fuel tank 44, such as for times while the engine 14 is not operating. In some embodiments, the valve 52 may also include a pressure relief portion to relive vapor pressure buildup in the fuel tank 44. As described, the system 42 may be used to provide fuel vapor to the engine 14 when desired. Accordingly, fuel vapor may be inhibited from flowing to the engine 14 at undesirable times (e.g., such as while shutting off the engine-driven generator 10). Therefore, undesirable behavior, such as "dieseling" may be reduced and/or eliminated.

Figure 3:
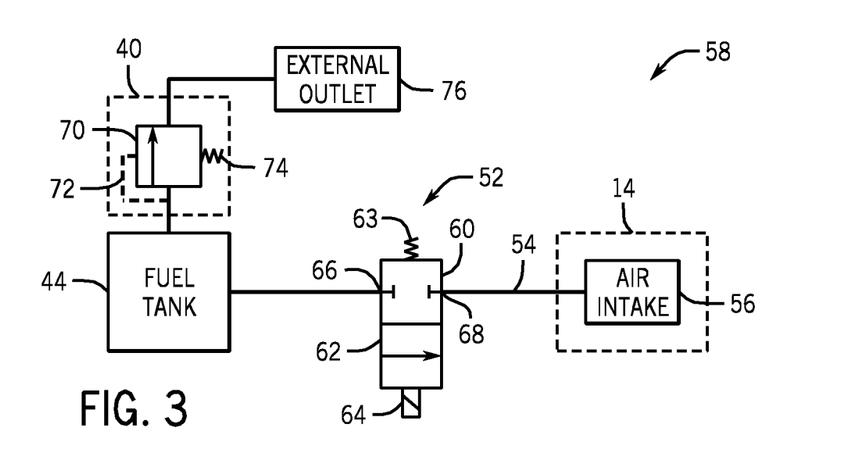
FIG. 3 is a block diagram of an embodiment of a system for controlling fuel vapor flow in an engine-driven generator using a two-way valve in accordance with aspects of the present disclosure.

FIG. 3 is a block diagram of an embodiment of a system 58 for controlling fuel vapor flow in the engine-driven generator 10 using a two-way valve 52. As illustrated, one embodiment of the valve 52 is depicted. The valve 52 includes a default position 60 and a controlled position 62. In the default position 60, fuel vapor flow between the fuel tank 44 and the engine 14 is blocked. In the controlled position 62, fuel vapor may flow between the fuel tank 44 and the engine 14. Specifically, fuel vapor may flow through the valve 52 and the hose 54 to the air intake 56 of the engine 14.

Force applied by a spring 63 holds the valve 52 in the default position 60. The force of the spring 63 may be overcome by energizing a solenoid 64 to transition the valve 52 to the controlled position 62. As will be appreciated, as long as the solenoid 64 is energized, the valve 52 will be held in the controlled position 62. The solenoid 64 may be energized by any suitable device of the engine-driven generator 10, as explained in detail below. A valve inlet 66 and a valve outlet 68 allow the fuel vapor to flow through the valve 52 (e.g., when the valve 52 is in the controlled position 62).

As discussed above, the fuel cap 40 may include a pressure relief valve 70. As such, fuel vapor pressure may flow through a pilot line 72. When the force applied via the pilot line 72 is greater than the force applied by a spring 74, fuel vapor may be released from the fuel tank 44 and flow to an external outlet 76. The external outlet 76 may be an opening to the atmosphere or a connection to a storage container used to store fuel vapor, for example. As will be appreciated, the pressure relief valve 70 may provide enhanced safety to the system 58 to inhibit excessive pressure buildup within the fuel tank 44. For example, the pressure relief valve 70 may be configured to vent or release fuel vapor when pressure within the fuel tank 44 exceeds a safety threshold such as 0.5, 1.0, 3.0, or 5.0 PSI.

The valve 52 may be configured to be in the default position 60 while the engine 14 is not operating. Further, the valve 52 may be configured to be in the controlled position 62 while the engine 14 is operating. Accordingly, pressure will not generally build within the fuel tank 44 while the engine 14 is operating because the valve 52 is in the controlled position 62. Therefore, the pressure relief valve 70 will generally operate while the engine 14 is not operating and the valve 52 is in the default position 60.

Figure 4:
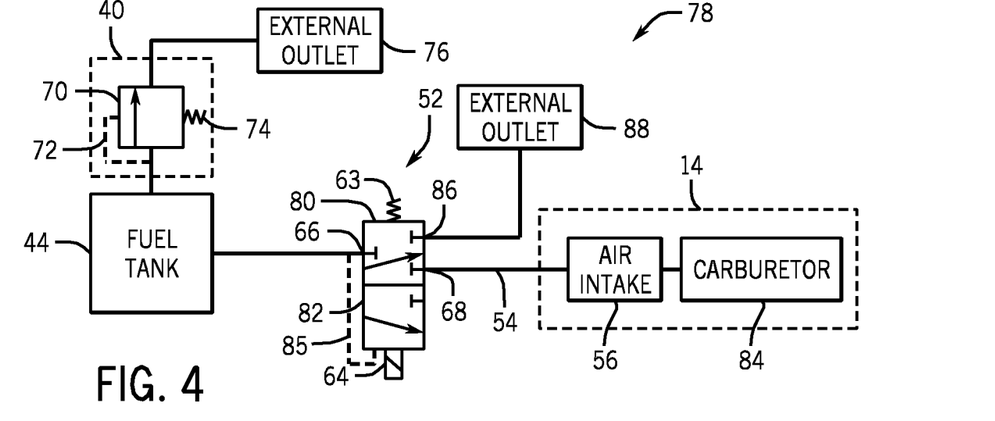
FIG. 4 is a block diagram of an embodiment of a system for controlling fuel vapor flow in an engine-driven generator using a two-way valve with pressure relief in accordance with aspects of the present disclosure.

FIG. 4 is a block diagram of an embodiment of a system 78 for controlling fuel vapor flow in the engine-driven generator 10 using a two-way valve 52 with pressure relief. Although the two-way valve 52 is integrated with the pressure relief, in certain embodiments, the pressure relief may be separate from the two-way valve 52. As will be appreciated, the two-way valve 52 with pressure relief may be considered a three-way valve. In the present embodiment, the valve 52 includes a default position 80 and a controlled position 82. In the default position 80, fuel vapor flow between the fuel tank 44 and the engine 14 is blocked. In the controlled position 82, fuel vapor may flow between the fuel tank 44 and the engine 14 (e.g., from the valve inlet 66 to the valve outlet 68). Specifically, fuel vapor may flow through the valve 52 and the hose 54 to the air intake 56 of the engine 14. Furthermore, fuel vapor may flow from the air intake 56 to a carburetor 84 of the engine 14. In other embodiments, fuel vapor may flow from the air intake 56 to a fuel injection system of the engine 14.

Force applied by the spring 63 holds the valve 52 in the default position 80. The force of the spring 63 may be overcome by energizing the solenoid 64 to transition the valve 52 to the controlled position 82. As will be appreciated, as long as the solenoid 64 is energized, the valve 52 will be held in the controlled position 82. The solenoid 64 may be energized by any suitable device of the engine-driven generator 10, as explained in detail below. The valve 52 also includes a pilot 85 that provides force to transition the valve 52 and to release pressure. The force applied by the pilot 85 may move the valve 52 a sufficient amount to enable fuel vapor to flow between the inlet port 66 and a relief port 86. The fuel vapor may exit the system 78 via an external outlet 88. The external outlet 88 may be an opening to the atmosphere or a connection to a storage container used to store fuel vapor, for example.

As illustrated, the system 78 may include the pressure relief valve 72 to operate in conjunction with the valve 52. For example, in certain embodiments, the pressure relief valve 72 may be configured to vent or release fuel vapor at a low or safety threshold pressure (e.g., 0.2 to 4.5 PSI). Further, the valve 52 may be configured to vent or release fuel vapor at a threshold pressure greater than the pressure relief valve 72. For example, the valve 52 may be configured to vent or release fuel vapor at a threshold pressure of between 5.0 and 10.0 PSI. Accordingly, if the pressure relief valve 72 does not release fuel vapor when expected, the valve 52 may operate as a backup pressure relief to inhibit over-pressurization from occurring.

Figure 5:
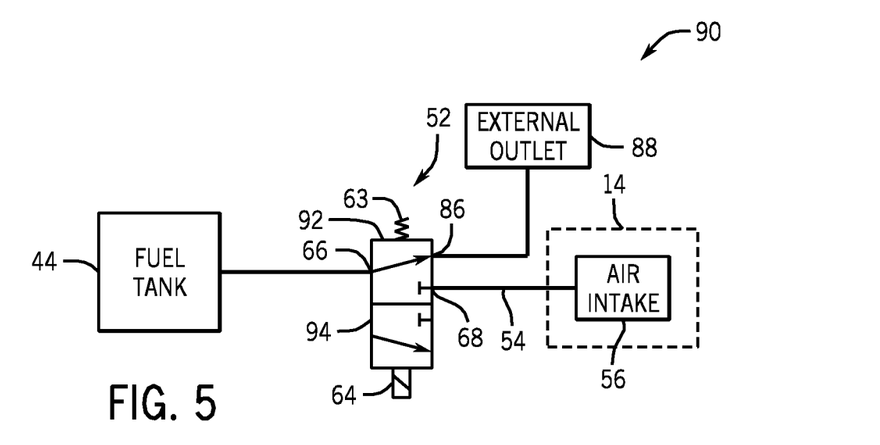
FIG. 5 is a block diagram of an embodiment of a system for controlling fuel vapor flow in an engine-driven generator using a three-way valve in accordance with aspects of the present disclosure.

FIG. 5 is a block diagram of an embodiment of a system 90 for controlling fuel vapor flow in the engine-driven generator 10 using a three-way valve 52 that directly enables flow from the inlet port 66 to the relief port 86, or from the inlet port 66 to the outlet port 68. As illustrated, the valve 52 includes a default position 92 and a controlled position 94. In the default position 92, fuel vapor may flow between the fuel tank 44 and the external outlet 88, while fuel vapor flow between the fuel tank 44 and the engine 14 is blocked. In the controlled position 94, fuel vapor may flow between the fuel tank 44 and the engine 14 (e.g., from the valve inlet 66 to the valve outlet 68), while fuel vapor flow between the fuel tank 44 and the external outlet 88 is blocked. Specifically, fuel vapor may flow through the valve 52 and the hose 54 to the air intake 56 of the engine 14. In such a configuration, fuel vapor may selectively be directed to either the external outlet 88 or the engine 14 without pressure buildup within the system 90.

Figure 6:
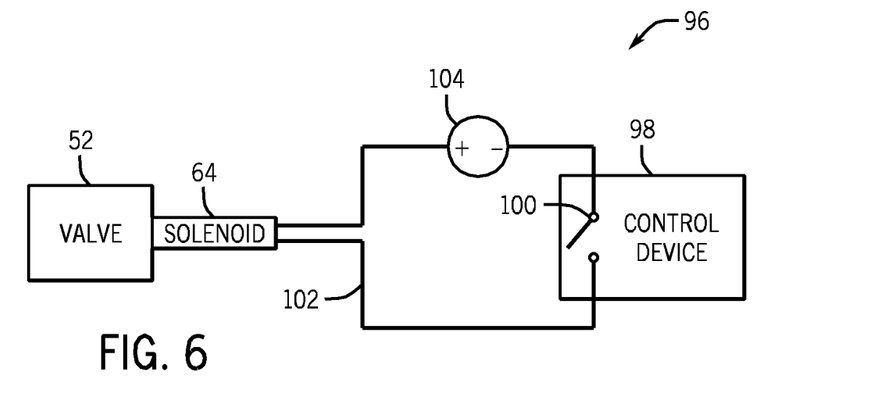
FIG. 6 is a block diagram of an embodiment of an engine-driven generator system having a control device to transition a valve for controlling fuel vapor flow in accordance with aspects of the present disclosure.

FIG. 6 is a block diagram of an embodiment of an engine-driven generator system 96 having a control device 98 to transition the valve 52 for controlling fuel vapor flow. The control device 98 may be configured to cause the valve 52 to change between a default and controlled position in order to control the flow of fuel vapor between the fuel tank 44 and the engine 14. For example, the control device 98 may be configured to enable fuel vapor flow between the fuel tank 44 and the engine 14 in any of the following conditions: while the engine 14 is operating, while a key is inserted into an ignition switch, while an ignition switch is turned to an operating state, while an oil pressure is greater than a threshold pressure, while an engine temperature is greater than a threshold temperature, and so forth. The control device 98 may include any suitable hardware and/or software. For example, the control device 98 may include one or more processors, memory devices, storage devices, executable code, circuitry, or any combination thereof.

When the control device 98 determines that the valve 52 should be switched from the default position to the controlled position, the control device 98 may close a switch 100 (e.g., in other embodiments, the control device 98 may open the switch 100). It should be noted that the switch 100 may be any type of suitable switching device (e.g., a physical switch, a solid state device, etc.). With the switch 100 closed, a circuit 102 connected to the solenoid 64 becomes complete. Accordingly, a voltage from a voltage source 104 is applied to the solenoid 64 to energize the solenoid 64 and change the position of the valve 52. As will be appreciated, the solenoid 64 may be deenergized by opening the switch 100 of the control device 98. As such, the control device 98 may control when fuel vapor may flow between the fuel tank 44 and the engine 14.

Figure 7:
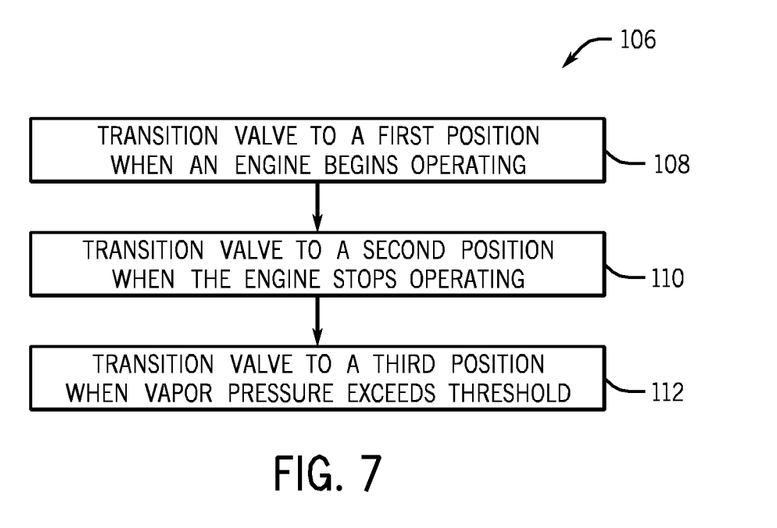
FIG. 7 is a flow chart of an embodiment of a method for controlling fuel vapor flow in an engine-driven generator system in accordance with aspects of the present disclosure.

FIG. 7 is a flow chart of an embodiment of a method 106 for controlling fuel vapor flow in the engine-driven generator system 10. The engine-driven generator system 10 may be configured to transition the valve 52 to a first position (e.g., controlled position 62, 82, 94) when the engine 14 begins operating (block 108). In the first position, fuel vapor may flow between the fuel tank 44 and the air intake 56 of the engine 14. In certain embodiments, the valve 52 may be transitioned to the first position when an oil pressure of the engine 14 or an ignition switch of the system 10 indicates that the engine 14 is operating. Furthermore, the engine-driven generator system 10 may be configured to transition the valve 52 to a second position (e.g., default position 60, 80, 92) when the engine 14 stops operating (block 110). In the second position, fuel vapor may be blocked or inhibited from flowing between the fuel tank 44 and the air intake 56 of the engine 14. In certain embodiments, the engine-driven generator system 10 may be configured to transition the valve 52 to a third position when a vapor pressure of the fuel vapor exceeds a threshold pressure (block 112).

Technical advantages of the engine-driven generator system 10 as explained above may include the following. The system 10 may direct fuel vapor to be used for engine 14 combustion while the engine 14, or system 10, is operating. In certain circumstances, such a system 10 may comply with regulatory agency requirements (e.g., Environmental Protection Agency (EPA)). Further, the system 10 as described herein may decrease or eliminate the occurrence of fuel vapor accumulation within the system 10. In addition, the occurrence of "dieseling" or "engine run on" conditions may be decreased or eliminated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine-driven generator comprising:
  an engine having an air intake passage, wherein the engine is configured to drive a generator;
  a fuel tank coupled to the engine and configured to provide fuel to the engine, wherein the fuel tank comprises a fuel cap having a pressure relief valve configured to release fuel vapor from the fuel tank when a pressure of the fuel vapor in the fuel tank reaches a first threshold pressure;
  a valve positioned between the air intake passage of the engine and the fuel tank, wherein the valve comprises an inlet, a first outlet, and a second outlet, the inlet being configured to receive the fuel vapor from the fuel tank, the first outlet being configured to provide the fuel vapor to the air intake passage of the engine, and the second outlet being configured to provide the fuel vapor to the atmosphere or to a storage container; and
  a control device configured to transition the valve between a first position and a second position, wherein the first position allows fuel vapor to flow from the fuel tank to the air intake passage of the engine and the second position inhibits the fuel vapor from flowing from the fuel tank to the air intake passage of the engine, and wherein the control device is configured to cause the valve to enable release of fuel vapor from the fuel tank when the pressure of the fuel vapor in the fuel tank reaches a second threshold pressure, the second threshold pressure being higher than the first threshold pressure, and wherein the control device is configured to transition the valve between the first position and the second position based on an oil pressure within the engine.

2. The engine-driven generator of claim 1, wherein the air intake passage is configured to receive the fuel vapor and provide the fuel vapor to a carburetor.

3. The engine-driven generator of claim 1, wherein the fuel tank comprises an upper portion configured to contact the fuel vapor and the valve is coupled to the upper portion of the fuel tank.

4. The engine-driven generator of claim 1, wherein the first threshold pressure is between approximately 0.5 to 3.0 PSI.

5. The engine-driven generator of claim 1, wherein the control device is configured to maintain the valve in the first position while the engine is operating and to maintain the valve in the second position while the engine is stopped.

6. The engine-driven generator of claim 1, wherein the air intake passage is configured to receive the fuel vapor and provide the fuel vapor to a fuel injection system.

7. A method for controlling fuel vapor flow in an engine-driven generator comprising:
  transitioning a valve to a first position, using a control device, when an engine of the engine-driven generator begins operating, wherein the first position allows the fuel vapor to flow between a fuel tank of the engine-driven generator and an air intake passage of the engine, wherein the valve comprises an inlet, a first outlet, and a second outlet, the inlet being configured to receive the fuel vapor from the fuel tank, the first outlet being configured to provide the fuel vapor to the air intake passage of the engine, and the second outlet being configured to provide the fuel vapor to the atmosphere or to a storage container;

transitioning the valve to a second position, using the control device, when the engine of the engine-driven generator stops operating, wherein the second position inhibits the fuel vapor from flowing between the fuel tank of the engine-driven generator and the air intake passage of the engine, wherein the control device is configured to transition the valve between the first position and the second position based on an oil pressure within the engine; and releasing the fuel vapor from the fuel tank using a pressure relief valve of a fuel cap disposed on the fuel tank when a pressure of the fuel vapor in the fuel tank reaches a threshold pressure.

8. The method of claim 7, wherein transitioning the valve to the first position when the engine of the engine-driven generator begins operating comprises transitioning the valve to the first position when the control device determines that the oil pressure of the engine indicates that the engine is operating.

9. The method of claim 7, wherein transitioning the valve to the first position when the engine of the engine-driven generator begins operating comprises transitioning the valve to the first position when the control device determines that a position of an ignition switch indicates that the engine is operating.

10. The method of claim 7, comprising transitioning the valve to a third position, using the control device, when the control device determines that the fuel vapor pressure exceeds the threshold pressure.

11. A portable engine-driven system comprising:
an engine having an air intake passage;
a fuel tank coupled to the engine and configured to provide fuel to the engine, wherein the fuel tank comprises a fuel cap having a pressure relief valve configured to release fuel vapor from the fuel tank when a pressure of the fuel vapor in the fuel tank reaches a first threshold pressure;
a solenoid valve coupled between the air intake passage of the engine and the fuel tank and configured to transition between a first position and a second position, wherein the first position allows fuel vapor to flow between the fuel tank and the air intake passage of the engine and the second position inhibits the fuel vapor from flowing between the fuel tank and the air intake passage of the engine, wherein the solenoid valve comprises an inlet, a first outlet, and a second outlet, the inlet being configured to receive the fuel vapor from the fuel tank, the first outlet being configured to provide the fuel vapor to the air intake passage of the engine, and the second outlet being configured to provide the fuel vapor to the atmosphere or to a storage container; and
a control device configured to cause the solenoid valve to be energized and de-energized to cause the solenoid valve to transition between the first and second positions, wherein the control device is configured to transition the valve between the first position and the second position based on an oil pressure within the engine.

12. The portable engine-driven system of claim 11, wherein the control device is configured to cause the solenoid valve to be energized to transition the solenoid valve to a third position configured to enable release of fuel vapor from the fuel tank when the control device determines that the pressure of fuel vapor in the fuel tank is above a second threshold pressure, wherein the second threshold pressure is higher than the first threshold pressure.

13. The portable engine-driven system of claim 11, wherein the control device is configured to change the valve between an energized state and a de-energized state to transition the valve to the first position when the engine begins operating and to transition the valve to the second position when the engine stops operating.

* * * * *